(12) United States Patent
Schmidt et al.

(10) Patent No.: US 10,951,126 B2
(45) Date of Patent: Mar. 16, 2021

(54) SYSTEM AND METHOD FOR OPERATING A SYSTEM (71) Applicant: SEW-EURODRIVE GMBH & CO. KG, Bruchsal (DE)

(72) Inventors: Josef Schmidt, Graben-Neudorf (DE); Matthias Hauck, Schwetzingen (DE); Jochen Weber, Plankstadt (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 136 days.

(21) Appl. No.: 16/335,753

(22) PCT Filed: Jul. 19, 2017

(86) PCT No.: PCT/EP2017/025217
§ 371 (c)(1),
(2) Date: Mar. 22, 2019

(87) PCT Pub. No.: WO2018/054543
PCT Pub. Date: Mar. 29, 2018

(65) Prior Publication Data
US 2019/0252992 A1    Aug. 15, 2019

(30) Foreign Application Priority Data

Sep. 22, 2016 (DE) .................... 10 2016 011 423.1

(51) Int. Cl.
*H02M 5/42* (2006.01)
*H02M 7/00* (2006.01)
(Continued)

(52) U.S. Cl.
CPC ............ *H02M 5/42* (2013.01); *H02J 7/0072* (2013.01); *H02M 3/33576* (2013.01);
(Continued)

(58) Field of Classification Search
CPC ...... H02P 27/08; H02P 21/22; H02M 3/1582; H02M 5/42; H02M 2003/1586;
(Continued)

(56) References Cited

U.S. PATENT DOCUMENTS

2007/0137945 A1* 6/2007 Takasaki .................. H02P 3/14
187/290
2008/0068870 A1* 3/2008 Eguchi .............. H02M 3/33584
363/37
(Continued)

FOREIGN PATENT DOCUMENTS

DE    102013006964 A1    10/2014
JP    H 01308136 A    12/1989
(Continued)

OTHER PUBLICATIONS

International Preliminary Report on Patentability issued in International Patent Application No. PCT/EP2017/025217, dated Apr. 4, 2109 (9 pages).
(Continued)

*Primary Examiner* — Jared Fureman
*Assistant Examiner* — Duc M Pham
(74) *Attorney, Agent, or Firm* — Carter Deluca & Farrell LLP (57) ABSTRACT

In a system and method for operating a system having a rectifier which is supplyable from an electric AC-voltage supply network, an inverter which feeds an electric motor, and a DC/DC converter which is connected to an energy accumulator, the DC-voltage side connection of the inverter is connected to the DC-voltage side connection of the rectifier, in particular, the electric motor is supplied from the AC-voltage side connection of the inverter, a first DC-voltage side connection of the DC/DC converter is connected to the DC-voltage side connection of the rectifier, in
(Continued)

particular, the DC-voltage side connection of the inverter and the first DC-voltage side connection of the DC/DC converter are connected in parallel, the DC/DC converter has a housing in which a device for current acquisition is situated, which acquires either the current, in particular network phase currents, flowing into the rectifier at the AC-voltage side connection of the rectifier, or the current emerging from the rectifier at the DC-voltage side connection of the rectifier, and the acquired value is forwarded to a signal electronics situated in the housing of the DC/DC converter, which generates control signals for semiconductor switches of the DC/DC converter.

19 Claims, 4 Drawing Sheets (51) Int. Cl.
| | |
|---|---|
| H02M 5/458 | (2006.01) |
| H02P 21/22 | (2016.01) |
| H02J 7/00 | (2006.01) |
| H02M 3/335 | (2006.01) |
| H02P 27/08 | (2006.01) |
| H02M 3/158 | (2006.01) |
| H02M 1/00 | (2006.01) |

(52) U.S. Cl.
CPC ........... *H02M 5/458* (2013.01); *H02M 7/003* (2013.01); *H02P 21/22* (2016.02); *H02P 27/08* (2013.01); *H02M 3/158* (2013.01); *H02M 3/1582* (2013.01); *H02M 2001/0009* (2013.01); *H02M 2001/0019* (2013.01); *H02M 2003/1586* (2013.01)

(58) Field of Classification Search
CPC ......... H02M 2001/0019; H02M 7/003; H02M 3/158; H02J 7/0072
See application file for complete search history.

(56) References Cited

U.S. PATENT DOCUMENTS

2014/0111005 A1* 4/2014 Liu ........................... H02J 9/04
307/20
2016/0311332 A1* 10/2016 Jang ..................... B60L 11/1811

FOREIGN PATENT DOCUMENTS

| | | |
|---|---|---|
| JP | H 06225458 A | 8/1994 |
| JP | 2003259566 A | 9/2003 |

OTHER PUBLICATIONS

International Search Report dated Nov. 11, 2017, in International Application No. PCT/EP2017/025217 (English-language translation).
Regelkreis Die freie Ezyklopädie, https://de.wikipedia.org/w/index.php?title=Regelkreis&oldid=1570, accessed on Jun. 23, 2017.
European Office Action mailed from the European Patent Office and issued to counterpart Application No. 17749609.8 dated May 4, 2020, 20 pages.

* cited by examiner

SYSTEM AND METHOD FOR OPERATING A SYSTEM

FIELD OF THE INVENTION

The present invention relates to a system and a method for operating a system.

BACKGROUND INFORMATION

The rotational speed of a three-phase motor can be varied with the aid of an inverter by which it is supplied.

U.S. Patent Application Publication No. 2007/0137945 describes a lift control.

Japanese Patent Document No. H06-225458 describes a power control method.

PCT Patent Document No. WO 01/74699 describes a method for reducing the power of the network connection of lift systems.

German Patent Document No. 10 2013 006 964 describes a device for operating a system.

SUMMARY

Example embodiments of the present invention provide a drive system that is able to be produced in a cost-effective manner.

According to an example embodiment of the present invention, a system has a rectifier which is able to be supplied from an electric AC-voltage supply network, an inverter which feeds an electric motor, and a DC/DC converter which is connected to an energy accumulator. The DC-voltage side connection of the inverter is connected to the DC-voltage side connection of the rectifier, and the electric motor is supplied from the AC-voltage side connection of the inverter, in particular. A first DC-voltage side connection of the DC/DC converter is connected to the DC-voltage side connection of the rectifier, and the DC-voltage side connection of the inverter and the first DC-voltage side connection of the DC/DC converter are switched in parallel, in particular. The DC/DC converter has a housing in which a current acquisition device is situated, which acquires either the current, in particular the network-phase currents, flowing into the rectifier at the AC-voltage side connection of the rectifier, or the current emerging from the rectifier at the DC-voltage side connection of the rectifier. The acquired value is conveyed to a signal electronics, which is situated in the housing of the DC/DC converter and generates control signals for semiconductor switches of the DC/DC converter.

This has the advantage that the additional current-acquisition device is situated in the housing of the converter in a housing-forming and protected manner. It is therefore possible to convey the sensor signal to the signal electronics of the converter. As a result, the drive system is uncomplicated in its production. Disturbances are avoidable because the housing is able to be produced from metal and can therefore be shielded from spurious radiation.

In example embodiments, the inverter is situated in a second, especially other, housing, in particular together with the rectifier, and the second housing is particularly set apart from the first housing, the network phase lines of the AC-voltage supply network are routed to an electrical connection device, in particular a plug-connector part, disposed on or in the first housing, and the current acquisition device is electrically connected to the electrical connection device. This is considered advantageous insofar as the acquisition of the input current at the rectifier takes place in close proximity to the signal electronics of the DC/DC converter and the acquisition is therefore connectable to the signal electronics of the DC/DC converter. In addition, the converter is uncomplicated to produce in that, for example, recesses may be produced in the housing wall in which plug-connector parts will then be able to be accommodated. The power-supply lines and the discharge lines are thus uncomplicated to produce with the aid of plug connections. However, the DC-voltage side of the inverter must be routed to the housing of the DC/DC converter and back again. This is because the current acquisition takes place on the network side at the rectifier, which is situated in the housing of the converter.

In example embodiments, the inverter, in particular together with the rectifier, is situated in a second, especially other housing, the second housing in particular being set apart from the first housing, and the current acquisition device is situated in the first housing, i.e. in the housing of the DC/DC converter, and is connected to a further electrical connection device, in particular a plug-connector part, the further electrical connection device being electrically connected to the DC-voltage side connection of the inverter.

This offers the advantage that the acquisition of the input current at the rectifier takes place in close proximity to the signal electronics of the DC/DC converter and the acquisition is therefore connectable to the signal electronics of the DC/DC converter. In addition, the converter is uncomplicated in its production in that, for example, recesses are able to be produced in the housing wall in which plug-connector parts may then be accommodated. The power-supply lines and the discharge lines are therefore easy to produce using plug connections. Since the rectifier is situated in the housing of the converter, it is also necessary to route the network supply there. The input-current acquisition is disposed on the DC-voltage side of the rectifier. However, the DC-voltage side of the inverter must be routed to the housing of the converter.

According to an example embodiment of the present invention, a system includes a rectifier which is supplyable from an electric AC-voltage supply network; an inverter which supplies an electric motor; and a DC/DC converter which is connected to an energy accumulator. The DC-voltage side connection of the inverter is connected to the DC-voltage side connection of the rectifier, and the electric motor is supplied from the AC-voltage side connection of the inverter, in particular. A first DC-voltage side connection of the DC/DC converter is connected to the DC-voltage side connection of the rectifier, and the DC-voltage side connection of the inverter and the first DC-voltage-side connection of the DC/DC converter are switched in parallel, in particular. The signal electronics of the DC/DC converter includes encompasses a controller unit, which controls the power absorbed from the AC-voltage supply network, in particular via the rectifier, to a setpoint value in that a controller, in particular a PI controller, determines a setpoint value for the charging current (I_CP_setpoint) as the controlled-variable signal based on the characteristic of the difference between the power (P_network) absorbed by the rectifier from the AC-voltage supply network and a setpoint value (P-network_setpoint), the acquired charging current of the energy accumulator is controlled to the setpoint value for charging current (I_CP_setpoint) in that control signals having a corresponding pulse pattern are generated for the semiconductor switches of DC/DC converter 4, in particular a precontrol path, in particular a path for a feedforward injection of a disturbance variable, is provided at the controller so that the power delivered or absorbed by the electric motor via the inverter is effective as a precontrol signal, in particular as a disturbance-variable signal. This offers the advantage that a simple control is able to be provided for reducing the power obtained from the network.

A charging current having a negative algebraic sign is a discharging current.

In example embodiments, the power (P_network) absorbed by the rectifier from the AC-voltage supply network is determined by multiplying the current determined from the acquired network phase currents and absorbed from the AC-voltage supply network, and the acquired or determined voltage. This offers the advantage that the power withdrawn from the network is able to be reduced.

In example embodiments, the power (P_network) absorbed by the rectifier from the AC-voltage supply network is determined by multiplying the acquired current that emerges from the DC-voltage side connection of the rectifier and the voltage applied at the DC-voltage side connection of the rectifier. This has the advantage that the current withdrawn from the network is able to be reduced.

In example embodiments, the signal electronics of the DC/DC converter includes a controller unit, which controls the current (I_ZK_N) absorbed from the AC-voltage supply network, in particular via the rectifier, to a setpoint value (I_ZK_N setpoint) in that a controller, in particular a PI controller, determines a setpoint value for charging current (I_CP_setpoint) as the controlled-variable signal based on the characteristic of the difference between the current (I_ZK_N) absorbed from the AC-voltage supply network, in particular via the rectifier, and the setpoint value (I_ZK_N setpoint). The acquired charging current of the energy accumulator is controlled to the setpoint value for charging current (I_CP_setpoint) in that control signals having a corresponding pulse pattern are generated for the semiconductor switches of DC/DC converter 4. A precontrol path is provided at the controller so that the current delivered or absorbed by the electric motor via the inverter is effective as a precontrol signal. This offers the advantage that a simple control structure may be used and becomes effective.

In example embodiments, a signal that corresponds to a power loss is added to the controlled variable. This has the advantage that the real conditions in the control structure are taken into account as best as possible.

In example embodiments, the charging current is restricted as a function of the charge state of the energy accumulator. This offers the advantage that the energy accumulator is protected against overcharging.

In example embodiments, the DC/DC converter is implemented as a dually configured, cascading step-down/step-up converter, which has two parts that are switched in parallel. This has the advantage that fewer current ripples are achievable, in particular through an offset clocking of the parts.

In example embodiments, the first part has a half-bridge on the input and the output side in each case, whose node is connected via a first inductivity L1, the second part has a half-bridge on the input and the output side in each case, whose node is connected via a second inductivity L2, a device adapted to acquire the sum current of the inductivities is provided, i.e. in particular a device adapted to acquire the sum of the currents flowing through the two inductivities (L1, L2), in particular, each half-bridge includes a series connection of two semiconductor switches, the acquired sum current I as charging current I_CP is conveyed to a controller unit as a setpoint value for an adjustment to the controlled-variable value I_CP_setpoint, in that the controller determines the pulse pattern of the control signals of the semiconductor switches of the half-bridges. This offers the advantage that the acquired sum current corresponds to the charging current.

In example embodiments, the first part has a half-bridge on the input and the output side in each case, whose node is connected via a first inductivity L1, the second part has a half-bridge on the input and the output side in each case, whose node is connected via a second inductivity L2, a device adapted to acquire the sum current of the inductivities is provided, i.e. in particular a device adapted to acquire the sum of the currents flowing through the two inductivities (L1, L2), each half-bridge in particular includes a series connection of two semiconductor switches, and a controller controls the acquired sum current in that the controller determines the pulse pattern of the control signals of the semiconductor switches of the half-bridges. This offers the advantage that the acquired sum current is equal to or proportional to the charging current I_CP. If the pulse-pattern generation for the half-bridges is implemented such that either half-bridges 31 and 32 or half-bridges 33 and 34 carry out a PWM, then the sum current is equal to I_CP when the voltage at capacitor C2 is smaller than the voltage at capacitor C1, i.e. half-bridges 31 and 32 carry out a PWM, and it is approximately proportional to I_CP at the ratio of the voltage at capacitor C2 to the voltage at capacitor C1 when the voltage at capacitor C2 is greater than the voltage at capacitor C1, i.e. half-bridges 33 and 34 carry out a PWM.

Further features and aspects of example embodiments of the present invention are described in greater detail below with reference to the appended Figures.

DETAILED DESCRIPTION

Figure 1:
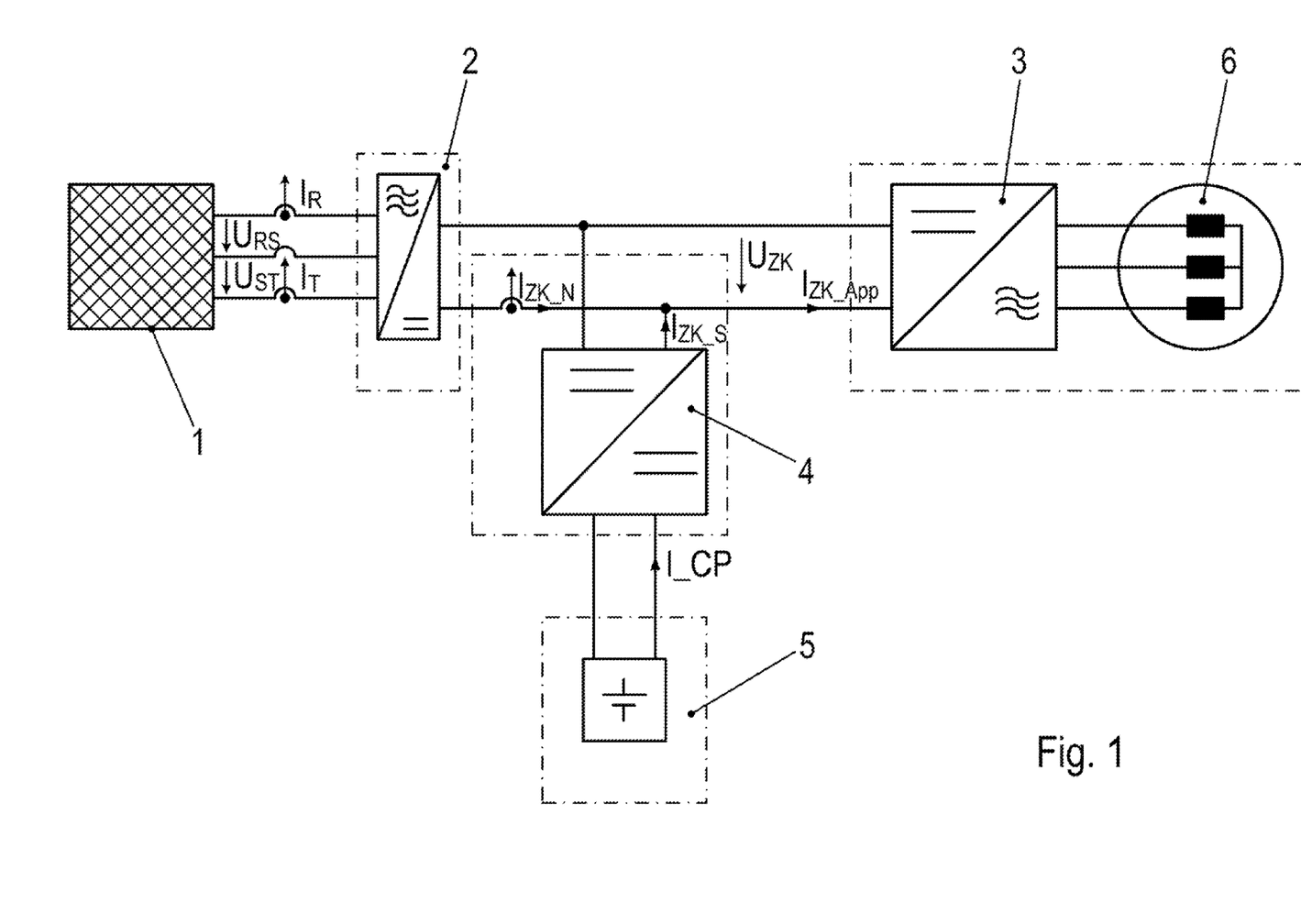
In FIG. 1, the system according to an example embodiment of the present invention including an energy accumulator 5, which is connected to an intermediate circuit via a DC/DC converter 4, is schematically illustrated.

As illustrated in FIG. 1, a rectifier 2 is supplied at its AC-voltage side connection from a three-phase AC-voltage supply network 1. Toward this end, three network phase lines are provided, and current acquisitions (I_R, I_T) are provided in at least two of the three phase lines.

The respective voltages existing between the phase lines are denoted by U_RS, U_ST and U_TR, respectively.

The voltage U_ZK, i.e. the intermediate-circuit voltage, is applied at the DC side connection of rectifier 2. Current I_ZK_N emerges from the DC side connection of rectifier 2.

Instead of the current acquisitions on the network side, it is also possible to use an acquisition of current I_ZK_N.

The DC side connection of a DC/DC converter 4 and the DC side connection of an inverter 3 supplying an electric motor 6 are switched in parallel and are able to be supplied from the DC side connection of rectifier 2, the DC side connection of rectifier 2 particularly also being switched in parallel.

Motor 6 may be arranged as a three-phase motor and connected at the AC-voltage side connection of inverter 3.

The housing of the DC/DC converter includes the current acquisition device adapted to acquire the current I_ZK_N emerging from the DC side connection of rectifier 2.

As an alternative, the current acquisition device adapted to acquire the currents flowing in the network phases (I_R, I_T) is situated inside the housing of DC/DC converter 4.

The rectifier and the inverter may be surrounded by another housing. This other housing may be set apart from the housing of the DC/DC converter.

An energy accumulator 5, which has at least an accumulator cell, a battery cell, a capacitor and/or an ultracap cell, is connected at the other DC-voltage side connection of DC/DC converter 4.

In example embodiments, the charging current I_CP of energy accumulator 5 emerging at this other DC-voltage side connection of DC/DC converter 4 is acquired using a current acquisition device, and the acquired value is forwarded to a signal electronics, which has a controller which controls the value to a setpoint value I_CP_setpoint by using the DC/DC converter as a final controlling element.

Figure 3:
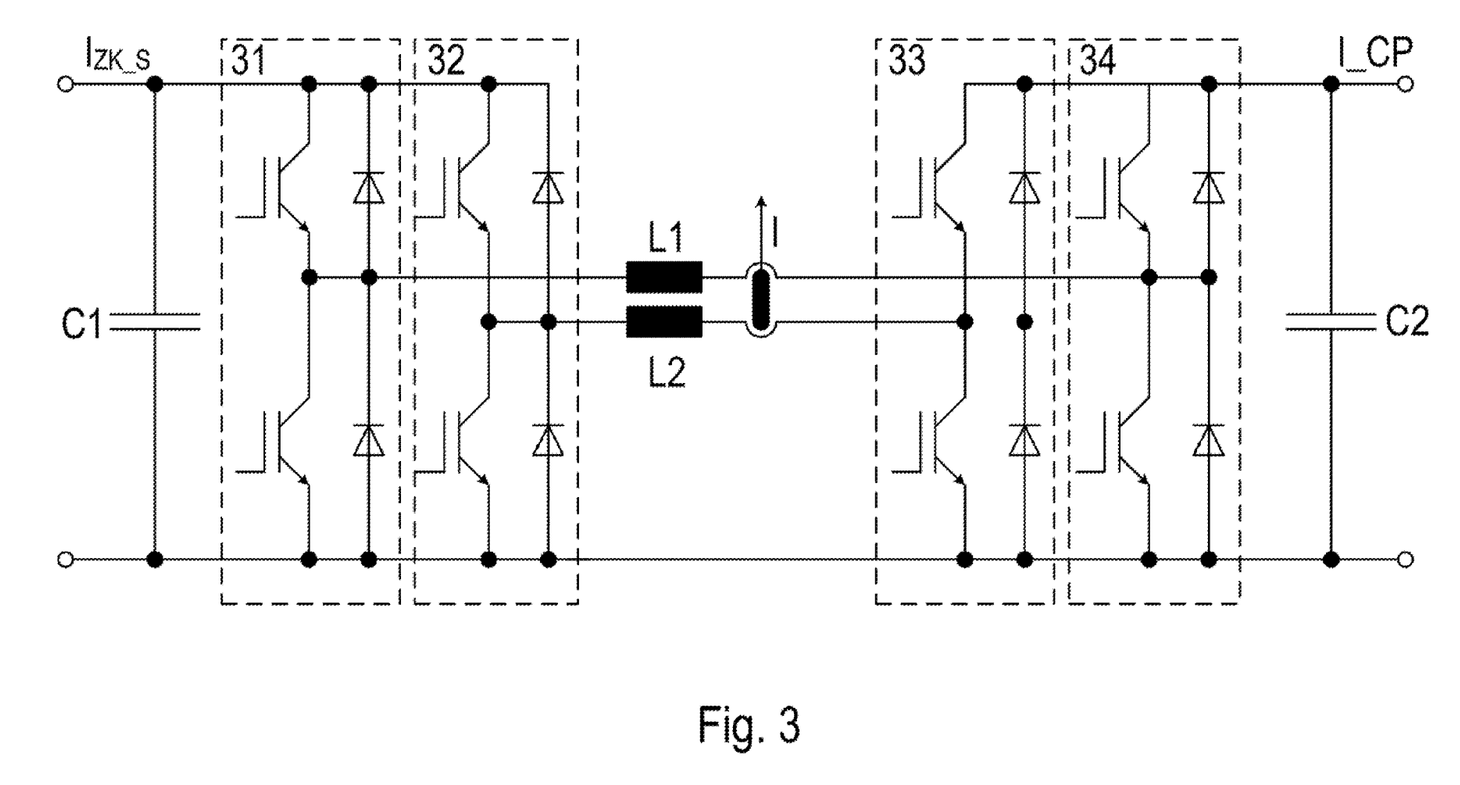
FIG. 3 shows an example embodiment of DC/DC converter 4.

However, the DC/DC converter has a dual configuration and is arranged as a cascading step-up/step-down converter which consequently has two parts that are switched in parallel, and the sum current I centrally acquired in DC/DC converter 4 is controlled to a setpoint value, in particular the setpoint value I_CP_setpoint, or to a setpoint value that is proportional thereto, in that the control signals of the switches of DC/DC converter 4 are generated accordingly, or in other words, in particular the pulse pattern, and in particular the pulse-width modulation ratio, is set accordingly.

Each part of the dually implemented converter 4 has a half-bridge (31 and 32, respectively) on the input side and a half-bridge (33 and 34, respectively) on the output side, whose nodal point is connected with the aid of a respective inductivity (L1, L2) in each case. Sum current I, i.e. the sum of the current flowing through inductivity L1 of the first part and the current flowing through inductivity L2 of the second part, is acquired with the aid of a current-measuring device. This current-measuring device may be arranged as a toroidal core around which the respective feed line of the respective inductivity L1 or L2 is wound and around which an additional winding is implemented in order to acquire the induced voltage.

Each one of the half-bridges (31, 32, 33, 34) has two controllable semiconductor switches, which are connected in series, i.e. are connected at the nodal point.

The dually cascading configuration of converter 4 results in low current rippling. It may particularly be reduced through an offset clocking of the two parts of converter 4, in particular using control signals that are shifted by 180° relative to one another.

To control sum current I to setpoint value I_CP_setpoint or to a setpoint value that is proportional thereto, a controller is provided, which is encompassed by the signal electronics of DC/DC converter 4. As described earlier, the pulse pattern of the control signals of the semiconductor switches of converter 4 are set.

Figure 2:
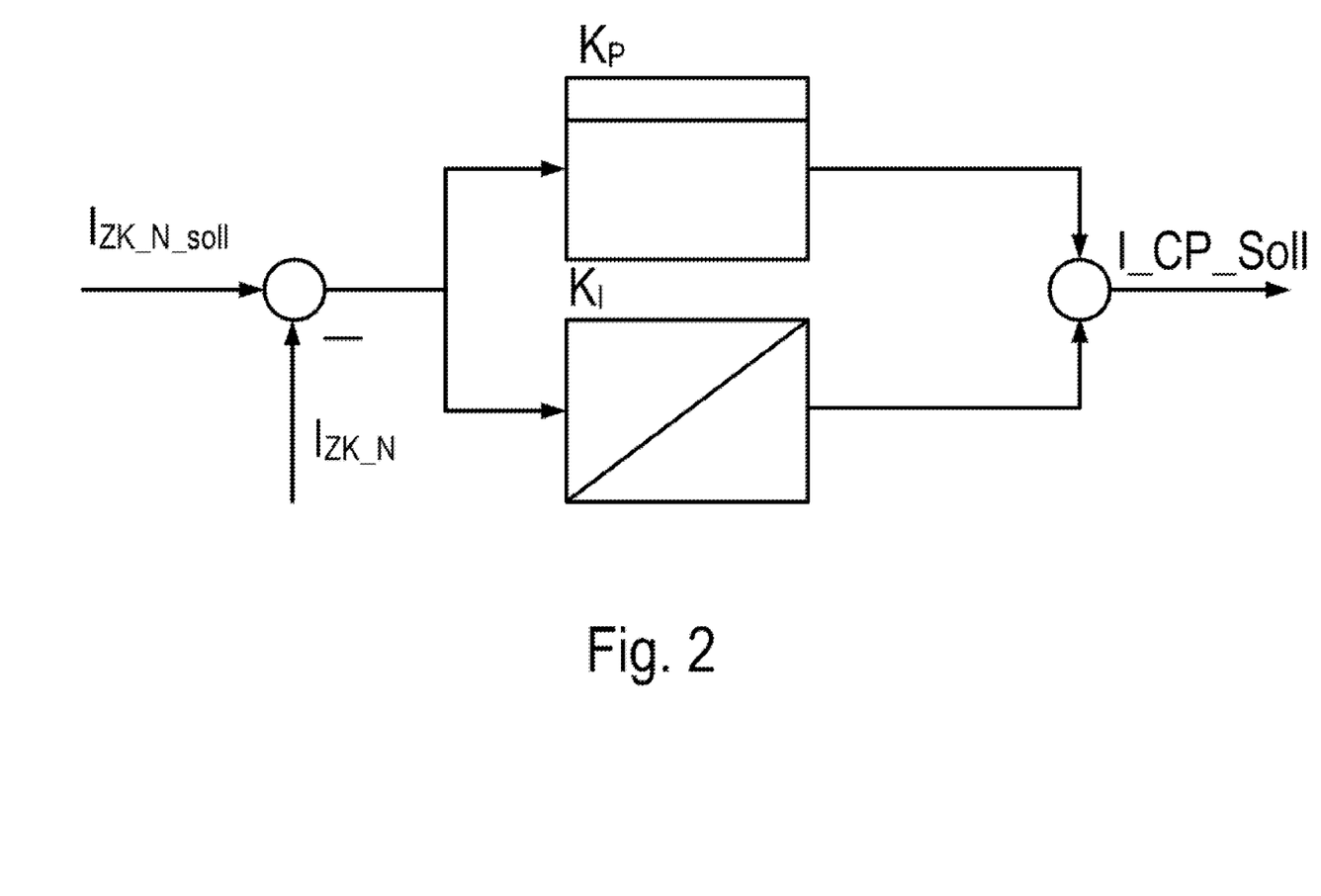
FIG. 2 shows a controller for operating the system, which controls the current withdrawn from the AC-voltage supply network to a setpoint value.

Setpoint value I_CP_setpoint is determined as the controlled variable by the controller device shown in FIG. 2 and likewise encompassed by the signal electronics, in that current value I_ZK_N, acquired with the aid of the device for acquiring current I_ZK_N disposed in converter 4, is used as the actual value, and the difference from a predefinable setpoint value I_ZK_N setpoint, in particular predefinable as a parameter, is determined. This difference is forwarded to the linear controller, i.e. proportional component K_P and integral component K_I, whose output signal, i.e. controlled variable, is used as setpoint value I_CP_setpoint.

Figure 4:
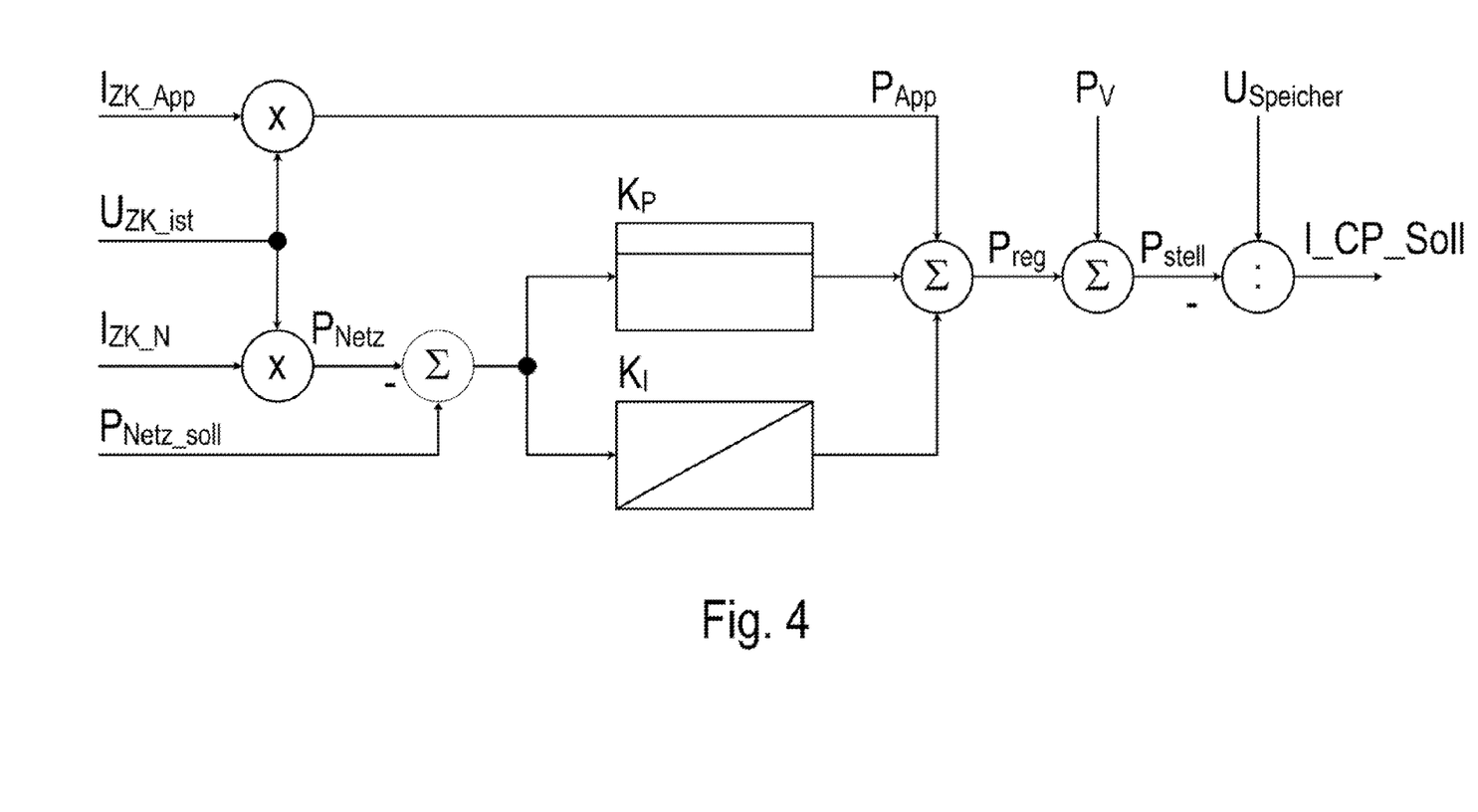
FIG. 4 shows an alternative control method for controlling the power absorbed from the AC-voltage supply network.

In the control method shown in FIG. 4, which in another exemplary embodiment is used as an alternative to the control method shown in FIG. 2, setpoint value I_CP_setpoint is determined via a determination of the power withdrawn from the AC-voltage supply network.

Toward this end, the acquired current that emerges at the DC-voltage side connection of rectifier 2 is multiplied by the voltage that is applied and acquired at the DC-voltage side connection of rectifier 2. The difference between the power value P_network obtained in this manner and a predefinable setpoint value P_network_setpoint is forwarded to a linear controller, which once again has a proportional component K_P and an integral component K_I, in particular.

Added to the output signal of the controller is power signal P_App via a precontrol path, i.e. in particular a path for a feedforward injection of a disturbance variable, which is determined by multiplying the voltage applied at the DC-voltage side connection of rectifier 2 and current I_ZK App supplied at the DC-voltage side connection of inverter 3. Power signal P_App is multiplied by multiplication of voltage U_ZK actual, applied and acquired at the DC-current side connection of rectifier 2, is multiplied by the current that emerges from the DC-current side connection of inverter 3.

The output signal of the controller, enlarged by power signal P_App, is denoted by P_reg, and a power-loss signal P_V is summed up, which represents the power loss of the energy accumulator system.

Power signal P_set obtained in this manner is divided by the voltage value U_accumulator applied and acquired at energy accumulator 5, thereby determining setpoint value I_CP_setpoint.

As described also in connection with the previous exemplary embodiment, the controller controls sum current I acquired in DC/DC converter 4 to setpoint value I_CP_setpoint determined in this manner or to a setpoint value that is proportional thereto, in that the pulse pattern of the control signals of the semiconductor switches of DC/DC converter 4 are set accordingly.

In contrast to the previously described exemplary embodiment, it is thereby possible to restrict the power withdrawn from the AC-voltage supply network rather than the current withdrawn from the AC-voltage supply network and to keep it as low as possible, Power-loss signal P_V takes the no-load power of the system and the losses of DC/DC converter 4 into account in the process.

Overcharging of energy accumulator 5 is avoided in that when a critical voltage value is exceeded, the maximally permissible charging current I_CP_setpoint is restricted as a function of the amount of the exceedance, i.e. in particular as a function of the difference between the voltage applied at energy accumulator 5 and the critical voltage value, in particular restricted to a decreasing value especially as the amount of the difference increases, until zero has been reached, in particular when the cut-off voltage is reached.

Alternatively or additionally, it is also possible to reduce setpoint value I_ZK_N setpoint for the current withdrawn from the AC-voltage supply network.

In further exemplary embodiments, a superposed charge-state controller is provided in addition, which may have a considerably greater time constant than the cycle time of the application driven by the motor. The superposed charge-state controller controls the charge state to a medium charge state and does this such that during the generator-mode operation of the application, the maximum charge state of the energy accumulator is not exceeded, and during the motor-mode operation of the application, the setpoint value of power P_network_setpoint received from the AC-voltage supply network is not exceeded.

In further exemplary embodiments, a device adapted to detect a network failure is provided, whose output signal either induces a switch-off of inverter 3 or a supply of inverter 3 from energy accumulator 5 once a threshold value has been exceeded or has not been thereby achieving an uninterruptible power supply-functionality, i.e. in particular the functionality of a power supply without interruptions.

The list of reference numerals is incorporated into the description of the figures.

LIST OF REFERENCE CHARACTERS

1 AC-voltage supply network
2 rectifier
3 inverter for electric motor 6
4 DC/DC converter for energy accumulator 5
5 energy accumulator, in particular having an accumulator cell, a battery cell, capacitor, and/or an ultracap cell
6 electric motor
31 first half-bridge
32 second half-bridge
33 third half-bridge
34 fourth half-bridge
I_R current acquisition in the first network phase
I_S current acquisition in the second network phase
I_T current acquisition in the third network phase
U_RS first network voltage
U_ST second network voltage
U_TR third network voltage
U_ZK_Ist actual value of the voltage applied at the DC-side connection of rectifier 2
I_ZK_N current emerging at the DC-side connection of rectifier 2
I_ZK App current emerging at the DC-side connection of inverter 3
I_ZK S current emerging at the DC-side connection of DC/DC converter 4
U_ZK voltage applied at the DC-side connection of rectifier 2
I_ZK_N_Soll setpoint value for the current I_ZK_N emerging at the DC-side connection of the rectifier
K_P proportional component
K_I integral component
I_S Soll setpoint value of the current component of the second network phase
I_CP Soll setpoint value of the current emerging from energy accumulator 5
C1 first capacitor
C2 second capacitor
L1 first inductivity
L2 second inductivity
P_Netz_Soll setpoint value of the power absorbed from the AC-voltage supply network
P_Netz power absorbed from the AC-voltage supply network
P_APP power absorbed by the second motor, in particular
P_V power loss
U_Speicher voltage applied at the energy accumulator
P_reg power to be ideally set
P_set set value of the power
I acquired compensating current

The invention claimed is:

1. A system, comprising:
a rectifier adapted to be supplied from an electrical AC-voltage supply network;
an inverter including an AC-voltage side connection adapted to feed an electric motor; and
a DC/DC converter connected to an energy accumulator;
wherein a DC-voltage side connection of the inverter is connected to a DC-voltage side connection of the rectifier, a first DC-voltage side connection of the DC/DC converter connected to a DC-voltage side connection of the rectifier, the DC-voltage side connection of the inverter and the first DC-voltage side connection of the DC/DC converter being switched in parallel, the DC/DC converter having a first housing in which a current acquisition device is arranged, the current acquisition device adapted to acquire (i) a current and/or network phase currents flowing into the rectifier at the AC-voltage side connection of the rectifier or (ii) a current emerging from the rectifier at the DC-voltage side connection of the rectifier, the current acquisition device adapted to forward an acquired value to signal electronics arranged in the housing of the DC/DC converter, the signal electronics adapted to generate control signals for semiconductor switches of the DC/DC converter.

2. The system according to claim 1, wherein the inverter is arranged in a second housing set apart from the first housing, network phase lines of the AC-voltage supply network are routed to an electrical connection device provided on and/or in the first housing, and the current acquisition device is electrically connected to the electrical connection device.

3. The system according to claim 2, wherein the electrical connection device includes a plug-connector part.

4. The system according to claim 1, wherein the inverter is arranged in a second housing set apart from the first housing, and the current acquisition device is provided in the first housing and is connected to a further electrical connection device electrically connected to the DC-voltage side connection of the inverter.

5. The system according to claim 4, wherein the further electrical connection device includes a plug-connector part.

6. A system, comprising:
a rectifier adapted to be supplied from an electrical AC-voltage supply network;
an inverter having an AC-voltage side connection adapted to feed an electric motor; and
a DC/DC converter connected to an energy accumulator;
wherein a DC-voltage side connection of the inverter is connected to a DC-voltage side connection of the rectifier, a first DC-voltage side connection of the DC/DC converter connected to the DC-voltage side connection of the rectifier, the DC-voltage side connection of the inverter and the first DC-voltage side connection of the DC/DC converter being switched in parallel;
wherein signal electronics of the DC/DC converter includes a controller unit adapted to control power absorbed from the AC-voltage supply network, via the rectifier, to a setpoint value in that a controller determines a setpoint value for a charging current as a controlled-variable signal based on a characteristic of a difference between the power absorbed by the rectifier from the AC-voltage supply network and a setpoint value, an acquired charging current of the energy accumulator is controlled to the setpoint value for charging current in that control signals having a corresponding pulse pattern are generated for semiconductor switches of the DC/DC converter; and wherein a precontrol path and/or a path for a feedforward injection of a disturbance variable is provided at the controller, so that power delivered and/or absorbed by the electric motor via the inverter is effective as a precontrol signal and/or a disturbance variable.

7. The system according to claim 6, wherein the controller includes a PI controller.

8. The system according to claim 6, wherein the power absorbed by the rectifier from the AC-voltage supply network is determined by multiplying a current determined from acquired network phase currents, absorbed from the AC-voltage supply network, and an acquired and/or determined voltage.

9. The system according to claim 6, wherein the power absorbed by the rectifier from the AC-voltage supply network is determined by multiplying an acquired current emerging from the DC-voltage side connection of the rectifier, and a voltage applied at the DC-voltage side connection of the rectifier.

10. The system according to claim 6, wherein the signal electronics of the DC/DC converter includes a controller unit adapted to control the current absorbed from the AC-voltage supply network, via the rectifier, to a setpoint value in that a controller determines a setpoint value for a charging current as a controlled-variable signal from a characteristic of a difference between current absorbed from the AC-voltage supply network, via the rectifier, and the setpoint value, an acquired charging current of the energy accumulator is controlled to the setpoint value for charging current in that control signals having a corresponding pulse pattern are generated for semiconductor switches of the DC/DC converter, a precontrol path and/or a path for feedforward injection of a disturbance variable, is provided at the controller, so that power output and/or absorbed by the electric motor via the inverter is effective as a precontrol signal and/or a disturbance variable.

11. The system according to claim 10, wherein the controller includes a PI controller.

12. The system according to claim 6, wherein a signal that corresponds to a power loss is added to the controlled variable.

13. The system according to claim 6, wherein the charging current is restricted as a function of a charge state of the energy accumulator.

14. The system according to claim 6, wherein the rectifier is arranged in a housing of the DC/DC converter.

15. The system according to claim 6, wherein the DC/DC converter is arranged as a dually configured, cascading step-down/step-up converter, having two parts that are switched in parallel, semiconductor switches of the parts being controlled at a time offset with respect to one another.

16. The system according to claim 15, wherein a first part has a half-bridge on an input side and an output side in each case, whose node is connected via a first inductivity, a second part has a half-bridge on an input side and an output side in each case, whose node is connected via a second inductivity, the system including a device adapted to acquire a sum current of the inductivities and/or to acquire a sum of currents flowing through the two inductivities, each half-bridge including a series connection of two semiconductor switches, the acquired sum current as the charging current being forwarded to a controller unit to control to the controlled-variable value and/or to a value that is proportional thereto, as a setpoint value in that the controller determines a pulse pattern of control signals of the semiconductor switches of the half-bridges.

17. A method for operating a system that includes a rectifier adapted to be supplied from an electrical AC-voltage supply network, an inverter adapted to feed an electric motor, and a DC/DC converter connected to an energy accumulator, a DC-voltage side connection of the inverter being connected to a DC-voltage side connection of the rectifier, the electric motor being supplied from an AC-voltage side connection of the inverter, a first DC-voltage side connection of the DC/DC converter connected to the DC-voltage side connection of the rectifier, the DC-voltage side connection of the inverter and the first DC-voltage side connection of the DC/DC converter being switched in parallel, signal electronics of the DC/DC converter including a controller unit, comprising:

controlling, to a setpoint value, power absorbed from the AC-voltage supply network, via the rectifier, in that a controller determines a setpoint value for a charging current as a controlled-variable signal based on a characteristic of a difference between the power absorbed by the rectifier from the AC-voltage supply network and a setpoint value; and controlling an acquired charging current of the energy accumulator to the setpoint value for the charging current in that control signals having a corresponding pulse pattern are generated for semiconductor switches of the DC/DC converter;

wherein a precontrol path and/or a path for a feedforward injection of a disturbance variable is provided at the controller so that power that is output and/or absorbed by the electric motor via the inverter is effective as a precontrol signal and/or a disturbance variable.

18. The method according to claim 17, wherein the controller includes a PI controller.

19. A system, comprising:
a rectifier adapted to be supplied from an electrical AC-voltage supply network;
an inverter including an AC-voltage side connection adapted to feed an electric motor; and
a DC/DC converter connected to an energy accumulator;
wherein a DC-voltage side connection of the inverter is connected to a DC-voltage side connection of the rectifier, a first DC-voltage side connection of the DC/DC converter connected to a DC-voltage side connection of the rectifier, the DC-voltage side connection of the inverter and the first DC-voltage side connection of the DC/DC converter being switched in parallel;
wherein:
(a) the DC/DC converter has a first housing in which a current acquisition device is arranged, the current acquisition device adapted to acquire (i) a current and/or network phase currents flowing into the rectifier at the AC-voltage side connection of the rectifier or (ii) a current emerging from the rectifier at the DC-voltage side connection of the rectifier, the current acquisition device adapted to forward an acquired value to signal electronics arranged in the housing of the DC/DC converter, the signal electronics adapted to generate control signals for semiconductor switches of the DC/DC converter; and
(b) signal electronics of the DC/DC converter includes a controller unit adapted to control power absorbed from the AC-voltage supply network, via the rectifier, to a setpoint value in that a controller determines a setpoint value for a charging current as a controlled-variable signal based on a characteristic of a difference between the power absorbed by the rectifier from the AC-voltage supply network and a setpoint value, an acquired charging current of the energy accumulator is controlled to the setpoint value for charging current in that control signals having a corresponding pulse pattern are generated for semiconductor switches of the DC/DC converter, and a precontrol path and/or a path for a feedforward injection of a disturbance variable is provided at the controller, so that power delivered and/or absorbed by the electric motor via the inverter is effective as a precontrol signal and/or a disturbance variable.

* * * * *